US012106738B2

(12) United States Patent
Jang

(10) Patent No.: US 12,106,738 B2
(45) Date of Patent: Oct. 1, 2024

(54) NOSE FLUTE CAPABLE OF IMPROVING BRAIN SENSATION AND COGNITION

(71) Applicant: Kwang Hyun Jang, Goyang-si (KR)

(72) Inventor: Kwang Hyun Jang, Goyang-si (KR)

( * ) Notice: Subject to any disclaimer, the term of this patent is extended or adjusted under 35 U.S.C. 154(b) by 0 days.

(21) Appl. No.: 18/571,620

(22) PCT Filed: Jun. 16, 2022

(86) PCT No.: PCT/KR2022/008565
§ 371 (c)(1),
(2) Date: Dec. 18, 2023

(87) PCT Pub. No.: WO2022/265437
PCT Pub. Date: Dec. 22, 2022

(65) Prior Publication Data
US 2024/0265893 A1 Aug. 8, 2024

(30) Foreign Application Priority Data
Jun. 18, 2021 (KR) ........................ 10-2021-0079534
Jul. 30, 2021 (KR) ........................ 10-2021-0100572

(51) Int. Cl.
*G10D 7/00* (2006.01)
*G10G 5/00* (2006.01)

(52) U.S. Cl.
CPC ................. *G10D 7/00* (2013.01); *G10G 5/00* (2013.01)

(58) Field of Classification Search
CPC ........................................................ G10D 7/00
See application file for complete search history.

(56) References Cited

U.S. PATENT DOCUMENTS 8,664,499 B2 * 3/2014 Hyun ........................ G10D 7/00 84/330
2019/0097008 A1 3/2019 Yanagigawa

FOREIGN PATENT DOCUMENTS

KR 20-1997-0005026 Y1 5/1997
KR 20-1997-0060803 U 12/1997
KR 10-0922157 B1 10/2009
KR 101545823 B1 * 8/2015
(Continued)

OTHER PUBLICATIONS

Seo. Lee. Chu, "Musical Instrument Recommendation!! I recommend the Koroa, which is expected to become a national instrument!" Retrieved on Dec. 6, 2023, Retrieved from: https://blog.naver.com/bakki45/220628983212.

*Primary Examiner* — Robert W Horn
(74) *Attorney, Agent, or Firm* — Maschoff Brennan

(57) ABSTRACT

The present invention relates to a nose flute capable of improving brain sensation and cognition and, more specifically, to a nose flute having a novel structure, which is a musical instrument that can be played using nasal air, so that brain sensation and cognition can be improved while sound width, sound and sound tone can be accurately implemented with accurate notes. To this end, the present invention comprises: a front body part in close contact with the body of a user; a sound generation part for generating sound of a preset height while the nasal air generated by the user flows therein through one end thereof and is discharged through the other end thereof; and a rear body part for fixing positions of the front body part and the sound generation part, and sealing the sound generation part so that same is not exposed to the outside.

7 Claims, 6 Drawing Sheets

(56) References Cited

FOREIGN PATENT DOCUMENTS

| | | | | |
|---|---|---|---|---|
| KR | 200480609 | Y1 | * | 6/2016 |
| KR | 10-1648328 | B1 | | 8/2016 |
| KR | 20-2017-0000261 | U | | 1/2017 |

* cited by examiner

114: 114a,114b

NOSE FLUTE CAPABLE OF IMPROVING BRAIN SENSATION AND COGNITION

TECHNICAL FIELD

The present invention relates to a nose flute capable of improving brain sensation and cognition, and more particularly, to a nose flute having a novel structure, which is a musical instrument that may be played by using nasal air, so that brain sensation and cognition may be improved while a sound width, a sound, and a sound intensity may be implemented with an accurate note.

BACKGROUND ART

In general, a wind instrument refers to an instrument configured to produce a sound by blowing air into a pipe formed of a metal, wood, a bamboo, or the like to allow the air inside the pipe to vibrate, and in order to blow the air into the wind instrument, the air may be blown into the pipe by using respiration through a mouth or a nose to play the wind instrument.

Among the wind instruments, a nose flute, which may be played by using a nose, refers to an instrument configured to play a musical scale through variations of a length and an intensity of air discharged to an outside through the nose and an opening shape of the mouth.

As such a nose flute, a nose flute configured to produce a sound by using nasal air has been described as shown in Korean Patent Registration No. 10-1648328, "Nose Flute with Improved Sound Quality", according to the related art. However, it may be difficult to play for a long time since a user has to blow the nasal air harder in order to generate an accurate musical scale desired by the user, and it may be difficult to perform detailed playing since it is impossible to maintain the accurate musical scale and intensity due to unstable respiration.

In addition, a nose flute configured to produce a sound by using nasal air has been described as shown in Korean Patent Registration No. 10-0922157, "Nose Flute with Adjustable Note", according to the related art. However, since it is difficult to adjust a position of an adjustment plate, it may be difficult to play a musical scale desired by a user, so that an inaccurate sound may be generated.

Accordingly, while the instrument has to be gripped in a correct position to allow the nasal air to be introduced into the instrument in order to play an accurate musical scale desired by the user, only a structure for simply producing a sound has been provided according to the related art described above, so that the instrument still does not include an element capable of playing music with various musical scales.

Accordingly, there is a demand for a nose flute capable of improving brain sensation and cognition as well as allowing various music to be played by implementing an accurate note desired by a user while solving the above problems.

DISCLOSURE

Technical Problem

The present invention has been devised to solve the above problems, and an object of the present invention is to provide a nose flute capable of improving brain sensation and cognition having a novel structure, which is a musical instrument that may be played by using nasal air, so that a sound width, a sound, and a sound intensity may be implemented with an accurate note.

In addition, an object of the present invention is to provide a nose flute capable of improving brain sensation and cognition, capable of guiding a user to accurately grip the nose flute, and playing music with various musical scales even without blowing nasal air hard.

Further, an object of the present invention is to provide a nose flute capable of improving brain sensation and cognition, which has a structure that facilitates the improvement of the brain sensation and the cognition involved by detailed finger movements and sensory coordination of a tongue and lips, in which such finger movements and sensory coordination of the tongue and the lips are necessarily required to play the nose flute.

Moreover, an object of the present invention is to provide a nose capable of improving brain sensation and cognition, in which the nose flute may excellently function as an educational tool in the music field to allow students to develop a sense of pitch while having fun through musical activities by playing the nose flute, and brain sensation and cognition of a user may be increased to not only improve an intellectual ability but also greatly assist in development of creative and expressive abilities.

Technical Solution

To achieve the objects described above, according to the present invention, there is provided a nose flute capable of improving brain sensation and cognition, the nose flute including: a front main body part (100) making close contact with a body of a user; a sound generation part (200) configured to generate a sound of a preset pitch as nasal air generated by the user is introduced into the sound generation part (200) through one end of the sound generation part (200) and discharged from an opposite end of the sound generation part (200); and a rear main body part (300) configured to fix positions of the front main body part (100) and the sound generation part (200), and seal the sound generation part (200) so that the sound generation part (200) is not exposed to an outside.

According to another embodiment of the present invention, the front main body part (100) may include: a front body member (110) including a first through-hole (111) having a polygonal shape and formed through front and rear surfaces of the front body member (110) at a predetermined position, a plurality of gripping parts (112) formed at predetermined positions on both side surfaces of the front body member (110), and a ring part (113) having an arc shape and formed at one end of the front body member (110); a close contact part (120) formed at one end of the front body member (110) so that a nose of the user makes close contact with the close contact part (120), and including a first introduction port (121) through which the nasal air generated by the user is introduced into the sound generation part (200); a sound generation part seating part (130) corresponding to a shape of the sound generation part (200) so that the sound generation part (200) is accommodated in the front body member (110); a first coupling part (140) protruding from a peripheral portion of the front body member (110), and including a plurality of coupling protrusions (141) protruding from predetermined positions of an inner side surface of the first coupling part (140); and a rope tie hole (150) formed perpendicularly through the front main body part (100) in a vertical direction at a predetermined position of the front main body part (100) and into which a rope tie part (400) is inserted.

According to another embodiment of the present invention, the sound generation part (200) may include: a sound generation part main body part (210) including a second through-hole (211) formed through a front portion of the sound generation part main body part (210) at a position corresponding to the first through-hole (111) of the front body member (110) and having a smaller size than the first through-hole (111), and a fixing hole (213) formed on a rear portion of the sound generation part main body part (210) so as to be seated and fixed to the rear main body part (300); an air movement part (220) formed at one end of the sound generation part main body part (210), and including a second introduction port (221) through which the nasal air of the user introduced from the first introduction port (121) of the close contact part (120) is introduced into the air movement part (220) and a movement passage (222) through which the nasal air introduced from the second introduction port (221) moves; and a space part (230) extending from the second introduction port (221) of the air movement part (220), in which a second space (230*b*) is smaller than a first space (230*a*).

According to another embodiment of the present invention, the second introduction port (221) may include an inlet (221*a*) through which the nasal air of the user is introduced and an outlet (221*b*) through which the nasal air is discharged by moving through the movement passage (222), and a vertical width of the outlet (221*b*) may be smaller than a vertical width of the inlet (221*a*).

According to still another embodiment of the present invention, the sound generation part (200) may further include a sound adjustment part (240) provided in an inner space (214) formed at an opposite end of the sound generation part main body part (210) and configured to slidably move in the vertical direction, and the sound adjustment part (240) may include: an adjustment main body part (241) having a shape corresponding to a shape of the inner space (214) of the sound generation part main body part (210); a guide part (242) including a guide protrusion part (242*a*) protruding from both ends of the adjustment main body part (241) in a predetermined shape, and a guide groove (242*b*) formed at both ends of an inner wall of the inner space (214), corresponding to the shape of the guide protrusion part (242*a*), and into which the guide protrusion part (242*a*) is slidably inserted; and a slide adjustment part (243) that allows the sound adjustment part (240) to be slidably moved in the vertical direction by the user.

According to another embodiment of the present invention, the rear main body part (300) may include: a rear body member (310) formed in a shape of a plate having a predetermined thickness, and including a rear part (311) having an arc shape and formed on a rear portion of the rear body member (310) and a ring plate (313) formed at one end of the rear body member (310) and making contact with one side surface of the ring part (113) formed from the front body member (110) to form a predetermined inner space; a sound generation part fixing part (330) formed on a front portion of the rear body member (310), corresponding to a shape of a rear portion of the sound generation part (200), and including fixing pin (333) protruding and inserted into the fixing hole (213) of the sound generation part (200); and a second coupling part (340) protruding from a peripheral portion of the front portion of the rear body member (310), and including a coupling groove (341) having a concave shape and formed at a position corresponding to the coupling protrusion (141) formed in the first coupling part (140) of the front main body part (100).

According to still another embodiment of the present invention, a coupling groove (122) having a concave shape may be formed at a predetermined position of the close contact part (120) of the front main body part (100), and the nose flute may further include a self-defense tube part (500) detachably attached to the close contact part (120).

According to another embodiment of the present invention, the self-defense tube part (500) may include: a tube body part (510) having a predetermined shape and formed of an elastic material; a ring part (520) having a ring shape and formed at one end of the tube body part (510); and a latch part (530) detachably attached to the ring part (520), and the tube body part (510) may include: an air discharge part (511) formed at an opposite end of the tube body part (510), and making contact with the first introduction port (121) formed in the close contact part (120) of the front main body part (100); a coupling protrusion (512) protruding from a predetermined position of the tube body part (510) to correspond to the shape and the position of the coupling groove (122) of the close contact part (120); and an air introduction part (513) formed at one end of the tube body part (510), and including a plurality of holes through which air is introduced into the tube body part (510).

According to another embodiment of the present invention, when a nose flute main body (10) is pulled downward while the latch part (530) is latched and coupled to a bag or a garment of the user, a predetermined amount of air may be discharged from the air discharge part (511) as the tube body part (510) is compressed, and the sound of the preset pitch may be generated as the air discharged from the air discharge part (511) is introduced into the sound generation part (200).

According to another embodiment of the present invention, the front main body part (100) may further include a lip contact part (114) protruding from upper and lower portions of the first through-hole (111) to allow the user to check positions of lips.

According to one embodiment, the lip contact part (114) may have a size and an area corresponding to an area of the lips of the user, and may have a shape in which an entire shape protrudes gradually or a shape in which a plurality of protruding protrusions protrude in an embossing shape.

Meanwhile, since descriptions of the technology disclosed in the present disclosure correspond merely to an embodiment for structural and functional descriptions, the scope of the disclosed technology shall not be construed as being limited by the embodiment described in the detailed description of the invention. In other words, since the embodiment may be variously changed and may have various forms, the scope of the disclosed technology shall be understood as encompassing equivalents that may implement the technical idea.

In addition, since the objects or effects presented in the disclosed technology do not mean that a specific embodiment has to include all of the objects or effects or only such effects, the scope of the disclosed technology shall not be understood as being limited by the objects or effects.

In addition, meanings of terms described in the present disclosure shall be understood as follows. Terms such as "first" and "second" may be used to distinguish one element from another element, and the scope shall not be limited by the terms. For example, a first element may be termed as a second element, and similarly, a second element may be termed as a first element.

Furthermore, when one element is described as being "connected" to another element, it shall be understood as being connected to the other element directly, but also as possibly having another element in between.

Meanwhile, when one element is described as being "directly connected" to another element, it shall be understood that there is no other element in between. Meanwhile, other expressions that describe a relation between elements, that is, "between" and "directly between" or "adjacent to" and "directly adjacent to" shall be interpreted similarly as described above.

Unless the context explicitly indicates otherwise, an expression in a singular form shall be understood as including a meaning of a plural form, and a term such as "including" or "having" is intended to designate the presence of characteristics, numbers, steps, operations, elements, parts, or combinations thereof that are described, and shall not be understood to preclude any possibility of presence or addition of one or more other characteristics, numbers, steps, operations, elements, parts, or combinations thereof.

Advantageous Effects

According to the present invention, a sound having a musical scale can be easily generated even when a user does not blow nasal air hard, and since the nasal air remains in the nose flute, a sound can be maintained for a long time to facilitate playing of the nose flute even when the nasal air is not continuously introduced into the nose flute.

According to the present invention, beautiful music can be played through movements of fingers that grip the nose flute, adjustment of an intensity of air introduced through a nose, and detailed movements and sensory adjustments adjusted while allowing a tongue and lips to make contact with the nose flute, and detailed finger movements and sensory coordination of the tongue and the lips involve improvement of brain sensation and cognition.

Students can develop a sense of pitch while having fun through musical activities by playing the nose flute according to the present invention, and brain sensation and cognition can be increased to not only improve an intellectual ability but also greatly assist in development of creative and expressive abilities, so that the nose flute can excellently function as an educational tool in the music field.

In addition, a user can be guided to accurately grip the nose flute according to the present invention to easily produce a correct sound, and the nose flute according to the present invention can be easily carried and stored.

BEST MODE

Figure 1:
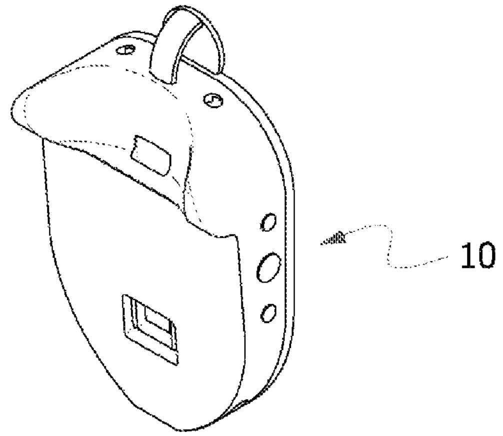
FIG. 1 is a view showing an overall shape of a nose flute according to the present invention.
Figure 2:
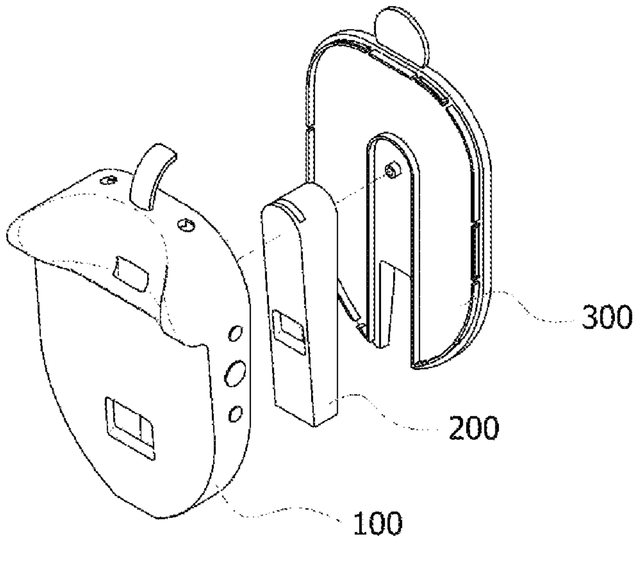
FIG. 2 is a view showing an exploded shape of the nose flute according to the present invention.

The following nose flute capable of improving brain sensation and cognition will be presented as the best mode of the present invention.

A nose flute capable of improving brain sensation and cognition, the nose flute including: a front main body part 100 making close contact with a body of a user;

a sound generation part 200 configured to generate a sound of a preset pitch as nasal air generated by the user is introduced into the sound generation part 200 through one end of the sound generation part 200 and discharged from an opposite end of the sound generation part 200; and a rear main body part 300 configured to fix positions of the front main body part 100 and the sound generation part 200, and seal the sound generation part 200 so that the sound generation part 200 is not exposed to an outside, wherein the front main body part 100 includes a rope tie hole 150 formed perpendicularly through the front main body part 100 in a vertical direction at a predetermined position of the front main body part 100 and into which a rope tie part 400 is inserted, the front main body part 100 further includes:

a front body member 110 including a first through-hole 111 having a polygonal shape and formed through front and rear surfaces of the front body member 110 at a predetermined position, a plurality of gripping parts 112 formed at predetermined positions on both side surfaces of the front body member 110, and a ring part 113 having an arc shape and formed at one end of the front body member 110; and a close contact part 120 formed at one end of the front body member 110 so that a nose of the user makes close contact with the close contact part 120, and including a first introduction port 121 through which the nasal air generated by the user is introduced into the sound generation part 200 and a coupling groove 122 having a concave shape and formed at a predetermined position of the close contact part 120 of the front main body part 100, the nose flute further includes a self-defense tube part 500 detachably attached to the close contact part 120, the self-defense tube part 500 includes:

a tube body part 510 having a predetermined shape and formed of an elastic material; a ring part 520 having a ring shape and formed at one end of the tube body part 510; and a latch part 530 detachably attached to the ring part 520, and the tube body part 510 includes:

an air discharge part 511 formed at an opposite end of the tube body part 510, and making contact with the first introduction port 121 formed in the close contact part 120 of the front main body part 100; a coupling protrusion 512 protruding from a predetermined position of the tube body part 510 to correspond to the shape and the position of the coupling groove 122 of the close contact part 120; and an air introduction part 513 formed at one end of the tube body part 510, and including a plurality of holes through which air is introduced into the tube body part 510.

MODE FOR INVENTION

Hereinafter, an embodiment of the present invention will be described in more detail.

First, FIGS. 1 to 6 are views showing an overall shape of a nose flute capable of improving brain sensation and cognition according to the present invention, in which a front main body part 100, a sound generation part 200, and a rear main body part 300 are formed in corresponding shapes and coupled to each other to form a nose flute main body 10.

In this case, the nose flute main body 10 may be formed of various materials such as a synthetic resin material such as plastic or wood.

The sound generation part 200 may be fixedly coupled to an inner space formed by integrally coupling the front main body part 100 to the rear main body part 300, and when a user generates nasal air while the front main body part 100 makes close contact with a body of the user, the generated nasal air may pass through the sound generation part 200 to generate a sound of a preset pitch.

Figure 3:
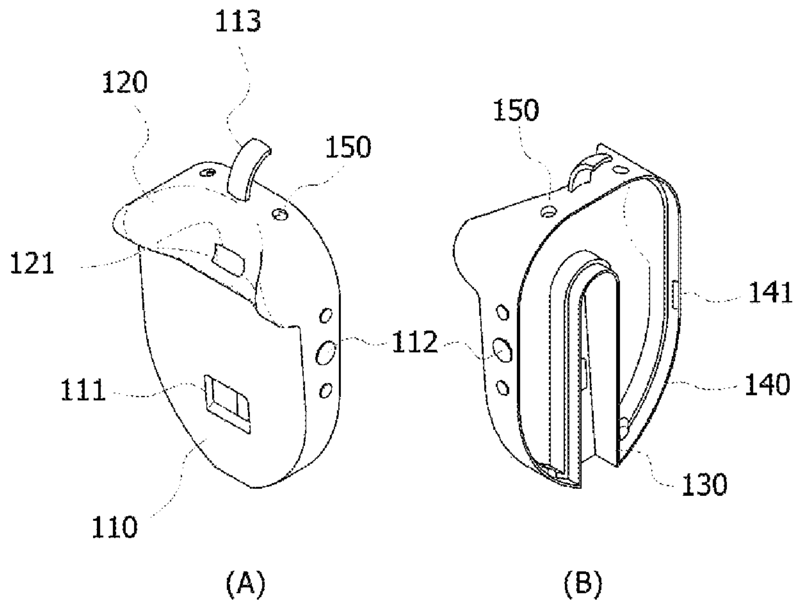
FIG. 3 is a view showing a front main body part of the nose flute according to the present invention.

As shown in FIG. 3, the front main body part 100 may include a front body member 110, a close contact part 120, a sound generation part seating part 130, a first coupling part 140, and a rope tie hole 150.

The front body member 110 may have a first through-hole 111 having a polygonal shape and formed through front and rear surfaces of the front body member 110 at a predetermined position. In this case, at least one of peripheral surfaces of the first through-hole 111 may be configured as an inclined surface having a predetermined inclination.

In addition, a plurality of gripping parts 112 arranged in a vertical direction may be formed at predetermined positions on both side surfaces of the front body member 110. In this case, the gripping parts 112 may have mutually different sizes, so that the user may easily determine a position of a protrusion that has been gripped only by touching the gripping part 112.

Although the gripping part 112 has been described in the present invention as protruding by a predetermined height, the gripping part 112 may be concave by a predetermined depth that allows the same object and function to be achieved, and may also be formed in figures having mutually different shapes.

A ring part 113 having an arc shape may be formed at one end of the front body member 110, and one end of the ring part 113 may make contact with one side surface of a ring plate 313 of the rear main body part 300, which will be described below, so that a key ring, various accessories, or the like maybe installed in a predetermined inner space formed by the ring part 113 and the ring plate 313 according to preference of the user.

The close contact part 120 with which a nose of the user makes close contact may be formed at one end of the front body member 110. The close contact part 120 may have a streamlined shape to allow the nose of the user to easily make close contact with close contact part 120, and may include a first introduction port 121 may be formed at a predetermined position of the close contact part 120 so that the nasal air generated by the user may be introduced into the sound generation part 200 formed inside the front main body part 100.

The sound generation part seating part 130 corresponding to a shape of the sound generation part 200 so that the sound generation part 200 is fixedly accommodated may be formed in an inner space, which is a rear portion of the front body member 110. In other words, the sound generation part 200 may be fitted into the sound generation part seating part 130, and may be detachably attached as necessary.

The first coupling part 140 may protrude from a peripheral portion of the front body member 110. In this case, a stepped sill having a step shape may be formed on an inner side surface of the first coupling part 140. In other words, the first coupling part 140 forming the peripheral portion of the front body member 110 may include a first surface and a second surface, and may have a thickness that gradually becomes thinner in a direction toward a rear surface, so that the stepped sill having the step shape may be formed on a portion of the inner side surface in which the first surface and the second surface make contact with each other. In this case, a plurality of coupling protrusions 141 may protrude from predetermined positions of the second surface of the first coupling part 140, which has a thinner thickness, so as to be coupled to the rear main body part 300.

Figure 9:
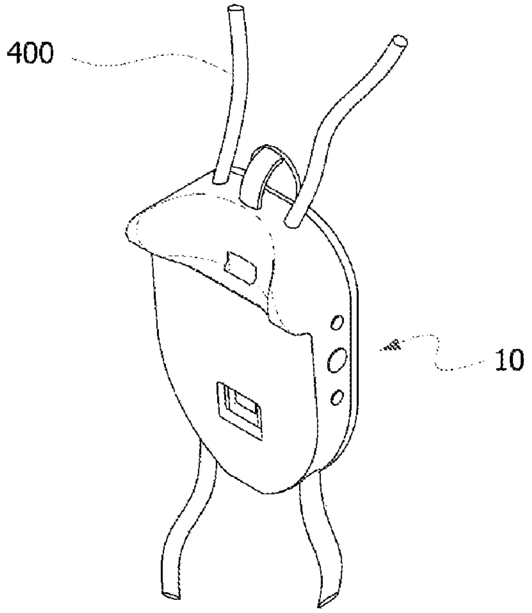
FIG. 9 is a view showing an embodiment of the nose flute according to the present invention.

Meanwhile, the rope tie hole 150 formed perpendicularly through the front body member 110 in the vertical direction may be formed at a predetermined position of the front body member 110. A rope tie part 400 (see FIG. 9) may be inserted into the rope tie hole 150 so as to be hung around a neck of the user or fastened to a bag or the like, so that the nose flute main body may be easily carried.

Figure 4:
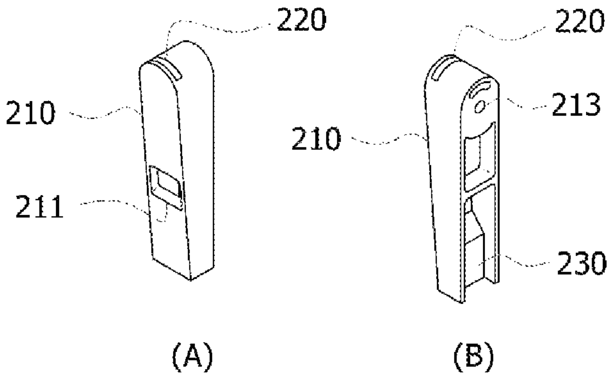
FIGS. 4 and 5 are views showing a sound generation part of the nose flute according to the present invention.
Figure 5:
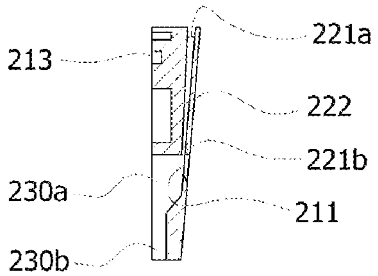
Figure 6:
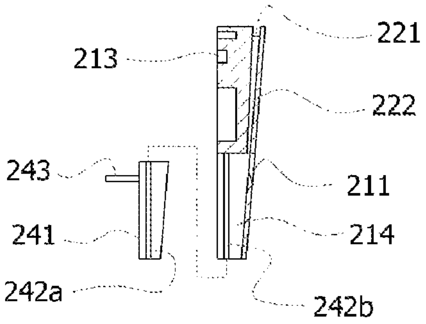
FIG. 6 is a view showing a sound generation part of a nose flute according to another embodiment of the present invention.

Next, FIGS. 4 to 6 are views showing the sound generation part 200, in which the sound of the preset pitch is generated as the nasal air generated by the user is introduced into the sound generation part 200 through one end of the sound generation part 200 and discharged from an opposite end of the sound generation part 200.

The sound generation part 200 may include a sound generation part main body part 210 having a polygonal shape, and an air movement part 220 formed at one end of the sound generation part main body part 210 and through which the nasal air of the user is introduced and moves. In addition, the sound generation part 200 may include a space part 230 extending from the air movement part 220.

A second through-hole 211 may be formed through a front portion of the sound generation part main body part 210 at a position corresponding to the first through-hole 111 of the front body member 110, the second through-hole 211 may have a smaller size than the first through-hole 111, and at least one of peripheral surfaces of the second through-hole 211 may be configured as an inclined surface having a predetermined inclination.

Figure 8:
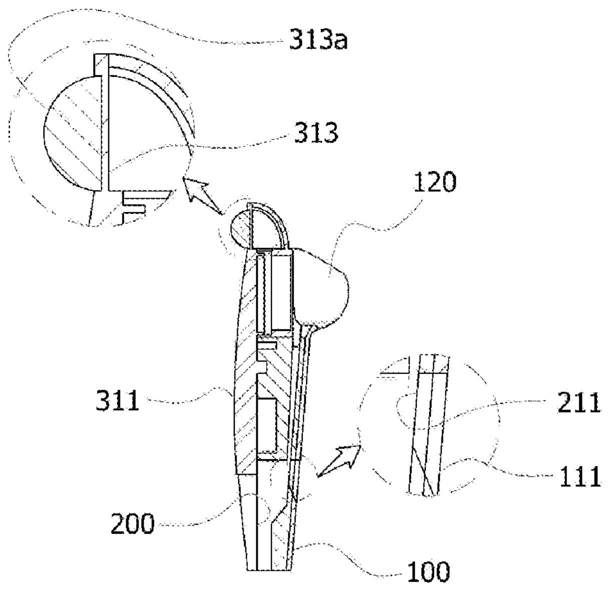
FIG. 8 is a sectional view showing a nose flute main body of the nose flute according to the present invention.

In this case, regarding the inclined surfaces formed on the peripheral surfaces of the first through-hole 111 and the second through-hole 211, since the first through-hole 111 and the second through-hole 211 are formed at positions corresponding to each other, as shown in FIG. 8, the inclined surfaces formed on the peripheral surfaces of the first through-hole 111 and the second through-hole 211 may match each other, so that the first through-hole 111 and the second through-hole 211 may form one inclined surface without forming a stepped sill.

A fixing hole 213 that is concave by a predetermined depth so as to be seated and fixed to the rear main body part 300 may be formed on a rear portion of the sound generation part main body part 210. The fixing hole 213 of the sound generation part main body part 210 may be coupled to a fixing pin 333 of the rear main body part 300, which will be described below.

The air movement part 220 may be formed at a position corresponding to the first introduction port 121 of the close contact part 120 so that the nasal air of the user supplied from the first introduction port 121 may be introduced. In other words, the first introduction port 121 may be formed through the close contact part 120 in the vertical direction, and the air movement part 220 may be formed through the sound generation part 200 in the vertical direction, so that penetration may extend from the first introduction port 121 to the air movement part 220.

The air movement part 220 may include a second introduction port 221 through which the nasal air of the user introduced from the first introduction port 121 is introduced into the air movement part 220, and a movement passage 222 through which the nasal air of the user introduced from the second introduction port 221 moves.

In this case, the second introduction port 221 may be configured such that the nasal air of the user is introduced through an inlet 221*a*, and the nasal air is discharged to an outside through an outlet 221*b* when the nasal air is moved through the movement passage 222.

Meanwhile, a vertical width of the outlet 221*b* may be relatively smaller than a vertical width of the inlet 221*a*, and a sound of a preset pitch may be generated to correspond to a length of the vertical width of the outlet 221*b*.

The air discharged from the second introduction port 221 may move through the space part 230 extending from the second introduction port 221 of the air movement part 220, and the space part 230 may include a first space 230*a* and a second space 230*b* having mutually different sizes as shown in FIG. 5.

In other words, the second space 230*b* may be relatively smaller than the first space 230*a*, and an inclined surface may be formed between the first space 230*a* and the second space 230*b*. Since the first space 230*a* is larger than the second space 230*b*, a residence time of the air discharged from the second introduction port 221 may be increased, so that the user may maintain the sound generated from the sound generation part 200 for a long sound generation time even without continuously generating the nasal air.

In addition, the sound generation part 200 may further include a sound adjustment part 240 as shown in FIG. 6.

The sound adjustment part 240 may be formed in an inner space 214 formed at an opposite end of the sound generation part main body pat 210, may slidably move in the vertical direction to adjust a residence time for the nasal air of the user moved through the air movement part 220, and may adjust a movement distance of the nasal air moving through the air movement part 220 so that a sound of a pitch desired by the user may be generated.

To describe the above configuration in detail, the sound adjustment part 240 may include: an adjustment main body part 241 having a shape corresponding to a shape of the inner space 214 of the sound generation part main body part 210; and a guide part 242 including a guide protrusion part 242*a* protruding from both ends of the adjustment main body part 241 in a predetermined shape, and a guide groove 242*b* formed at both ends of an inner wall of the inner space 214, corresponding to the shape of the guide protrusion part 242*a*, and into which the guide protrusion part 242*a* is slidably inserted.

In other words, as the guide protrusion part 242*a* of the adjustment main body part 241 is slidably inserted into the guide groove 242*b* of the inner space 214, the adjustment main body part 241 may be slidably moved by a predetermined distance in the vertical direction by the user. In this case, the sound adjustment part 240 may include a slide adjustment part 243 protruding by a predetermined length so that the sound adjustment part 240 may be slidably moved in the vertical direction by the user.

When the user allows the nose of the user to make close contact with the close contact part 120, generates the nasal air, and allows the nasal air to be introduced into the first introduction port 121 of the close contact part 120 while gripping the nose flute main body 10, the nasal air may pass through the first introduction port 121 so as to be introduced into the inlet 221*a* of the second introduction port 221 and move through the movement passage 222, and the sound of the preset pitch may be generated as the nasal air is discharged through the outlet 221*b*. In this case, the adjustment main body part 241 may be slidably moved by a predetermined distance in the vertical direction by using the slide adjustment part 243 to adjust a distance between the outlet 221*b* and the sound adjustment part 240, so that the preset pitch of the sound may be artificially adjusted.

Figure 7:
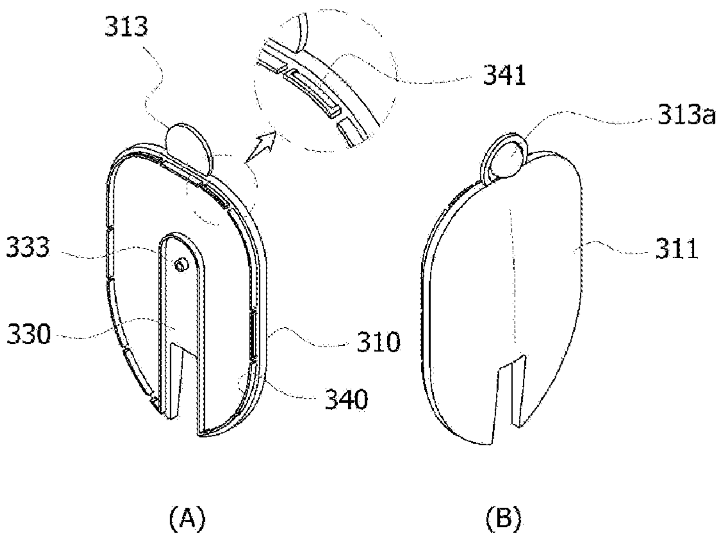
FIG. 7 is a view showing a rear main body part of the nose flute according to the present invention.

Next, referring to FIGS. 7 and 8, the rear main body part 300 may include a rear body member 310 formed in a shape of a plate having a predetermined thickness. In this case, the rear body member 310 may include: a rear part 311 forming a curve having an arc shape, and formed on a rear portion of the rear body member 310; and a ring plate 313 formed at one end of the rear body member 310 and making contact with one side surface of the ring part 113 formed from the front body member 110 to form a predetermined inner space.

Although the ring plate 313 has been described in the present invention as having a circular plate shape, the ring plate 313 may have various shapes that allow the same object and function to be achieved.

In addition, a gripping part 313*a* protruding by a predetermined height may be formed on a rear portion of the ring plate 313, so that the user may check an accurate gripping position only with a sensation of a finger without directly checking the nose flute main body 10 with eyes, and may adjust a force to allow the nasal air of the user to be accurately introduced into the sound generation part 200 so that to the nose and a mouth of the user may accurately make contact.

Although a shape of the gripping part 313*a* has been described in the present invention as being a hemispherical shape, the gripping part 313*a* may have various shapes that allow the same object and function to be achieved.

A sound generation part fixing part 330 corresponding to a shape of a rear portion of the sound generation part 200 may be formed on a front portion of the rear body member 310 at a predetermined position. In this case, the sound generation part fixing part 330 may include a fixing pin 333 protruding by a predetermined length so as to be inserted into the fixing hole 213 formed on the rear portion of the sound generation part 200.

In other words, when the front body member 110 and the rear body member 310 are coupled to each other, a space part formed by the sound generation part seating part 130 of the front body member 110 and the sound generation part fixing part 330 of the rear body member 310 may correspond to a shape and a form of the sound generation part 200 so as to allow the sound generation part 200 to be stably fitted and coupled thereto, and the sound generation part 200 may be firmly fixed to the rear body member 310 as the fixing pin 333 is inserted into the fixing hole 213 of the sound generation part 200.

A second coupling part 340 protruding by a predetermined length may be formed at a peripheral portion of the front portion of the rear body member 310. In this case, the second coupling part 340 may include a coupling groove 341 having a concave shape and formed at a position corresponding to the coupling protrusion 141 formed in the first coupling part 140, so that the coupling protrusion 141 and the coupling groove 341 may be engaged with each other to allow the front main body part 100 and the rear main body part 300 to be firmly coupled and fixed to each other.

Furthermore, a plurality of second coupling parts 340 may be provided on a plurality of nodes at predetermined positions, so that the front main body part 100 and the rear main body part 300 may be easily separated from each other by applying a predetermined force as necessary.

Figure 10:
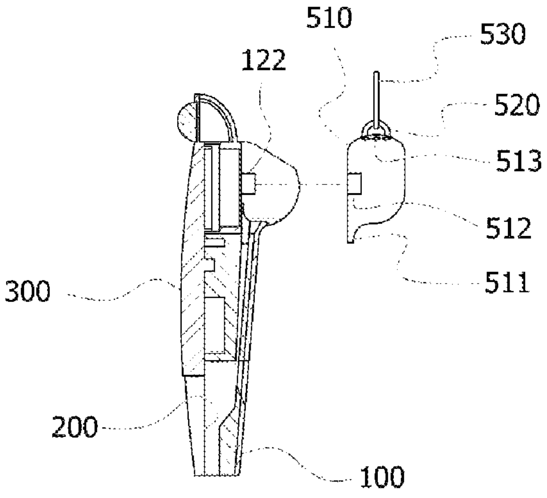
FIGS. 10 and 11 are views showing a use state of the nose flute according to another embodiment of the present invention.
Figure 11:
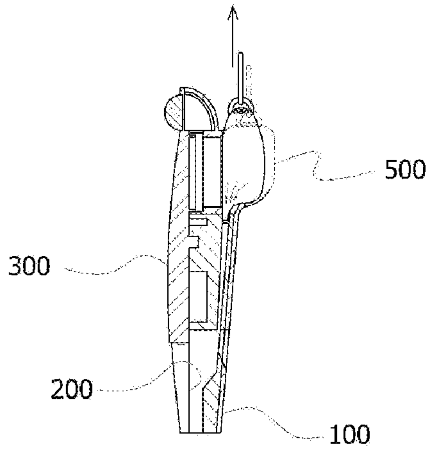

Next, FIGS. 10 and 11 are views showing another embodiment of the present invention, in which the close contact part 120 of the front main body part 100 includes a pair of coupling grooves 122 having a concave shape and formed at predetermined positions on both left and right sides of the close contact part 120, and a self-defense tube part 500 may be detachably attached by the pair of coupling grooves 122.

To describe the above configuration in detail, the self-defense tube part 500 may include a tube body part 510 having a predetermined shape, and the tube body part 510 may be formed of an elastic material so that the tube body part 510 may be restored to an original shape thereof even when a predetermined force is applied.

An air discharge part 511 may be formed at an opposite end of the tube body part 510 to make contact with the first introduction port 121 formed in the close contact part 120 of the front main body part 100. In other words, the air discharge part 511 may protrude by a predetermined length so as to be inserted into the first introduction port 121 by a predetermined length.

A coupling protrusion 512 protruding to correspond to the shape and the position of the coupling groove 122 formed in the close contact part 120 may be formed at a predetermined position of the tube body part 510. In this case, the coupling groove 122 and the coupling protrusion 512 may be coupled to each other in a forward-rearward direction, so that the self-defense tube part 500 coupled to the close contact part 120 may be prevented from being separated even when a force is applied in the vertical direction.

In addition, an air introduction part 513 including a plurality of holes through which air is introduced into the tube body part 510 may be formed at one end of the tube body part 510. In other words, even when the air inside the tube body part 510 escapes through the air discharge part 511 as the tube body part 510 is compressed by a predetermined force, external air may be introduced into the tube body part 510 through the air introduction part 513, so that the tube body part 510 may be restored to the original shape thereof.

A ring part 520 having a ring shape may be formed at one end of the tube body part 510, and a latch part 530 that may be detachably attached to the ring part 520. In this case, the latch part 530 may have a ring shape so as to be detachably attached to a bag or a garment of the user.

When the nose flute main body 10 is pulled downward by the user while the nose flute main body 10 is latched and coupled to the bag or the garment of the user by the latch part 530, a predetermined amount of air may be discharged to the outside through the air discharge part 511 as the tube body part 510 is compressed, and the sound of the preset pitch may be generated by the sound generation part 200 as the air discharged from the air discharge part 511 passes through the first introduction port 121 so as to be introduced into the sound generation part 200, so that the user may generate a sound to notify the surroundings of a dangerous situation or a situation in which help is required.

Figure 12:
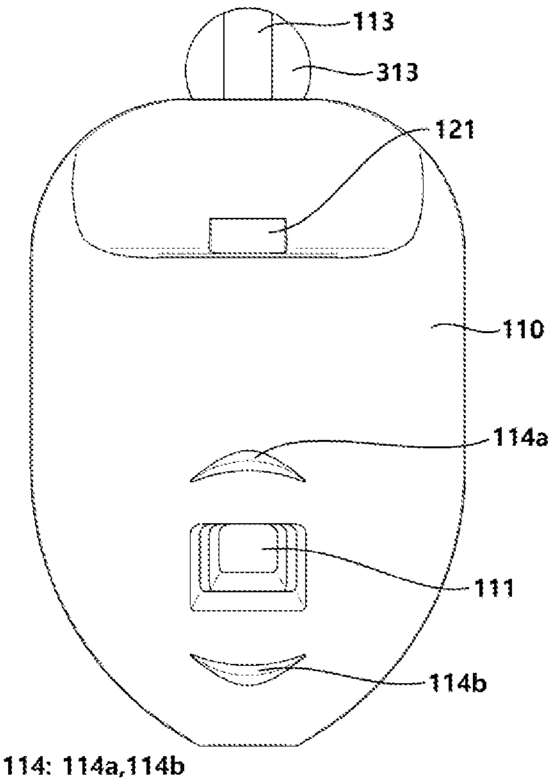
FIG. 12 is a view showing an embodiment in which a lip contact part is formed on the front main body part of the nose flute according to the present invention.

Meanwhile, referring to FIG. 12, the nose flute capable of improving the brain sensation and the cognition according to the present invention may further include a lip contact part 114 formed on one side of the front body member 110 of the front main body part 100.

According to an exemplary embodiment, the lip contact part 114 may protrude from upper and lower portions of the first through-hole 111 to allow the user to check positions of lips.

The lip contact part 114 may preferably have a size and an area corresponding to an area of the lips of the user.

In addition, the lip contact part 114 may have a shape in which an entire shape protrudes gradually, or a shape in which a plurality of protruding protrusions protrude in an embossing shape as necessary.

Although the lip contact part 114 has been shown in the drawing according to one embodiment as being divided into an upper lip contact part 114*a* on which an upper lip of the user is located and a lower lip contact part 114*b* on which a lower lip of the user is located, the lip contact part 114 is not limited thereto, and the lip contact part 114 may have one shape that surrounds the first through-hole 111 as necessary.

In this way, the lip contact part 114 protruding from the positions in which the lips of the user are located to make close contact with the lips may allow the user to properly put the lips to make contact with a correct position since the user may feel a delicate sensation of the lips on a protruding portion of the lip contact part 114, and may train the user to delicately use the sensation of the lips while playing the nose flute through a process of repeatedly removing and attaching the lips.

In other words, beautiful music may be played through detailed movements and sensory adjustments adjusted while allowing the lips to make contact with the nose flute according to the present invention, and detailed finger movements and sensory coordination of a tongue and the lips may involve improvement of brain sensation and cognition.

As described above, according to the nose flute capable of improving the brain sensation and the cognition of the present invention, which includes the front main body part 100, the sound generation part 200, and the rear main body part 300, the brain sensation and the cognition may be improved through training.

First, an increase in the brain sensation and the cognition by a finger movement through the nose flute capable of improving the brain sensation and the cognition according to the present invention will be described.

Among 206 bones constituting our body, 25% of the bones are used to configure both hands. Since humans began walking upright, humans have used their free hands to perform delicate and diverse tasks, and created civilization by using tools.

Neurophysiologists say that hand sensations felt through hand movements play a major role in forming an exquisite neuropil in brain.

Referring to a homunculus, which is a human model that represents an area of the brain responsible for a movement and a sensation for each body region, two hands occupy the largest area. This shows that a sensory function of the hand is important and delicate to that extent. Since the hands have the largest number of sensory organs concentrated thereto among human body regions, the hands react sensitively to external sensory stimulation.

As a result, it may be considered that the brain develops as much as the user uses the hands.

Movements using both hands, such as typing, stimulate both sides of the brain to increase creativity, and the hands and the brain respond to each other as brain nerves are stimulated according to the movements of the hands. For this reason, dementia patients with reduced cognition may slow down the progression of dementia symptoms by stimulating brain nerve cells by performing activities using hands through drawing, paper folding, or the like.

According to the nose flute capable of improving the brain sensation and the cognition of the present invention, the nose flute may be gripped with fingers when playing music.

Such a finger movement of gripping the nose flute may perform a function of increasing the brain sensation and the cognition of the user of the nose flute. Education experts say that a finger activity not only improves an intellectual ability but also greatly assists in development of creative and expressive abilities. In a case of musicians who play musical instruments with both hands, brain imaging results show that the musicians use both left and right hemispheres of the brain more actively than ordinary people.

Next, an increase in the brain sensation and the cognition by a tongue movement through the nose flute according to the present invention will be described.

The simplest way to activate brain cells is to move the tongue. Scientists' research has shown that frequent training of the tongue indirectly stimulates nerves in the brain and a facial region to reduce brain atrophy and prevent facial nerves and muscles from aging.

Scientists say that the biggest cause of human aging is brain atrophy, and the most obvious symptom of brain atrophy is a stiff tongue and hard facial expressions. Scientists say that as a way to delay brain atrophy, exercise of the tongue every morning and evening in addition to diet is very helpful in activating brain cells, which is very helpful in preventing brain atrophy.

When the music is played, the nose flute according to the present invention may be played by injecting air with the nose and allowing the tongue and the lips to make contact with the nose flute. While playing the nose flute, the user may be trained to use detailed sensations of the tongue and the lips.

In order to excellently play the music by using the nose flute according to the present invention, as a result, beautiful music may be played through movements of fingers that grip the nose flute, adjustment of an intensity of the air introduced through the nose, and detailed movements and sensory adjustments adjusted while allowing the tongue and the lips to make contact with the nose flute according to the present invention.

In conclusion, detailed finger movements and sensory coordination of the tongue and the lips are necessarily required to play the nose flute according to the present invention, and such finger movements and sensory coordination of the tongue and the lips involve the improvement of the brain sensation and the cognition.

Therefore, the nose flute according to the present invention may excellently function as an educational tool in the music field. Students may develop a sense of pitch while having fun through musical activities by playing the nose flute, and brain sensation and cognition may be increased to not only improve an intellectual ability but also great assist in development of creative and expressive abilities.

Although exemplary embodiments of the present invention have been described above, various modifications and changes can be made to the present invention by those skilled in the art without departing from the idea and scope of the present invention as set forth in the appended claims.

The invention claimed is:

1. A nose flute capable of improving brain sensation and cognition, the nose flute comprising:

a front main body part (100) making close contact with a body of a user;

a sound generation part (200) configured to generate a sound of a preset pitch as nasal air generated by the user is introduced into the sound generation part (200) through one end of the sound generation part (200) and discharged from an opposite end of the sound generation part (200); and a rear main body part (300) configured to fix positions of the front main body part (100) and the sound generation part (200), and seal the sound generation part (200) so that the sound generation part (200) is not exposed to an outside, wherein the front main body part (100) includes a rope tie hole (150) formed perpendicularly through the front main body part (100) in a vertical direction at a predetermined position of the front main body part (100) and into which a rope tie part (400) is inserted, the front main body part (100) further includes:

a front body member (110) including a first through-hole (111) having a polygonal shape and formed through front and rear surfaces of the front body member (110) at a predetermined position, a plurality of gripping parts (112) formed at predetermined positions on both side surfaces of the front body member (110), and a ring part (113) having an arc shape and formed at one end of the front body member (110); and a close contact part (120) formed at one end of the front body member (110) so that a nose of the user makes close contact with the close contact part (120), and including a first introduction port (121) through which the nasal air generated by the user is introduced into the sound generation part (200) and a coupling groove (122) having a concave shape and formed at a predetermined position of the close contact part (120) of the front main body part (100), the nose flute further comprises a self-defense tube part (500) detachably attached to the close contact part (120), the self-defense tube part (500) includes:

a tube body part (510) having a predetermined shape and formed of an elastic material;

a ring part (520) having a ring shape and formed at one end of the tube body part (510); and a latch part (530) detachably attached to the ring part (520), and the tube body part (510) includes:

an air discharge part (511) formed at an opposite end of the tube body part (510), and making contact with the first introduction port (121) formed in the close contact part (120) of the front main body part (100);

a coupling protrusion (512) protruding from a predetermined position of the tube body part (510) to correspond to the shape and the position of the coupling groove (122) of the close contact part (120); and an air introduction part (513) formed at one end of the tube body part (510), and including a plurality of holes through which air is introduced into the tube body part (510).

2. The nose flute of claim 1, wherein the front main body part (100) includes:

a sound generation part seating part (130) corresponding to a shape of the sound generation part (200) so that the sound generation part (200) is accommodated in the front body member (110); and a first coupling part (140) protruding from a peripheral portion of the front body member (110), and including a plurality of coupling protrusions (141) protruding from predetermined positions of an inner side surface of the first coupling part (140), and the first coupling part (140) protrudes to form a stepped sill having a step shape on the inner side surface of the first coupling part (140).

3. The nose flute of claim 1, wherein the sound generation part (200) includes:

a sound generation part main body part (210) including a second through-hole (211) formed through a front portion of the sound generation part main body part (210) at a position corresponding to the first through-hole (111) of the front body member (110) and having a smaller size than the first through-hole (111), and a fixing hole (213) formed on a rear portion of the sound generation part main body part (210) so as to be seated and fixed to the rear main body part (300);

an air movement part (220) formed at one end of the sound generation part main body part (210), and including a second introduction port (221) through which the nasal air of the user introduced from the first introduction port (121) of the close contact part (120) is introduced into the air movement part (220) and a movement passage (222) through which the nasal air introduced from the second introduction port (221) moves, in which the second introduction port (221) includes an inlet (221*a*) through which the nasal air of the user is introduced and an outlet (221*b*) through which the nasal air is discharged by moving through the movement passage (222), and a vertical width of the outlet (221*b*) is smaller than a vertical width of the inlet (221*a*); and a space part (230) extending from the second introduction port (221) of the air movement part (220), in which a second space (230*b*) is smaller than a first space (230*a*), the sound generation part (200) further includes a sound adjustment part (240) provided in an inner space (214) formed at an opposite end of the sound generation part main body part (210) and configured to slidably move in the vertical direction, and the sound adjustment part (240) includes:

an adjustment main body part (241) having a shape corresponding to a shape of the inner space (214) of the sound generation part main body part (210);

a guide part (242) including a guide protrusion part (242*a*) protruding from both ends of the adjustment main body part (241) in a predetermined shape, and a guide groove (242*b*) formed at both ends of an inner wall of the inner space (214), corresponding to the shape of the guide protrusion part (242*a*), and into which the guide protrusion part (242*a*) is slidably inserted; and a slide adjustment part (243) that allows the sound adjustment part (240) to be slidably moved in the vertical direction by the user.

4. The nose flute of claim 1, wherein the rear main body part (300) includes:

a rear body member (310) formed in a shape of a plate having a predetermined thickness, and including a rear part (311) having an arc shape and formed on a rear portion of the rear body member (310) and a ring plate (313) formed at one end of the rear body member (310) and making contact with one side surface of the ring part (113) formed from the front body member (110) to form a predetermined inner space;

a sound generation part fixing part (330) formed on a front portion of the rear body member (310), corresponding to a shape of a rear portion of the sound generation part (200), and including a fixing pin (333) protruding and inserted into the fixing hole (213) of the sound generation part (200); and a second coupling part (340) protruding from a peripheral portion of the front portion of the rear body member (310), and including a coupling groove (341) having a concave shape and formed at a position corresponding to the coupling protrusion (141) formed in the first coupling part (140) of the front main body part (100).

5. The nose flute of claim 1, wherein, when a nose flute main body (10) is pulled downward while the latch part (530) is latched and coupled to a bag or a garment of the user, a predetermined amount of air is discharged from the air discharge part (511) as the tube body part (510) is compressed, and the sound of the preset pitch is generated as the air discharged from the air discharge part (511) is introduced into the sound generation part (200).

6. The nose flute of claim 1, wherein the front main body part (100) further includes a lip contact part (114) formed on one side of the front body member (110) and protruding from upper and lower portions of the first through-hole (111) to allow the user to check positions of lips.

7. The nose flute of claim 6, wherein the lip contact part (114) has a size and an area corresponding to an area of the lips of the user, and has a shape in which an entire shape protrudes gradually or a shape in which a plurality of protruding protrusions protrude in an embossing shape.

* * * * *